(12) United States Patent
Kim et al.

(10) Patent No.: US 12,227,977 B2
(45) Date of Patent: Feb. 18, 2025

(54) HINGE SYSTEM FOR VEHICLE DOOR

(71) Applicants: Hyundai Motor Company, Seoul (KR); Kia Corporation, Seoul (KR); PHA Co., Ltd., Daegu (KR)

(72) Inventors: Duck Young Kim, Hwaseong-si (KR); Doo Young Jung, Suwon-si (KR); Seong Tae Hong, Daegu (KR); Yong Ju Kim, Hwaseong-si (KR)

(73) Assignees: Hyundai Motor Company, Seoul (KR); Kia Corporation, Seoul (KR); PHA Co., Ltd., Daegu (KR)

( * ) Notice: Subject to any disclaimer, the term of this patent is extended or adjusted under 35 U.S.C. 154(b) by 116 days.

(21) Appl. No.: 18/051,667

(22) Filed: Nov. 1, 2022

(65) Prior Publication Data

US 2024/0003173 A1 Jan. 4, 2024

(30) Foreign Application Priority Data

Jun. 29, 2022 (KR) ........................ 10-2022-0079812

(51) Int. Cl.
*E05F 1/08* (2006.01)
*B60J 5/04* (2006.01)
*B62D 65/06* (2006.01)
*E05D 3/02* (2006.01)
*E05D 5/06* (2006.01)
*E05F 15/63* (2015.01)

(52) U.S. Cl.
CPC .............. *E05D 3/02* (2013.01); *B60J 5/0468* (2013.01); *B60J 5/0473* (2013.01); *B62D 65/06* (2013.01); *E05D 5/062* (2013.01); *E05F 15/63* (2015.01); *E05Y 2201/626* (2013.01); *E05Y 2600/45* (2013.01); *E05Y 2900/531* (2013.01)

(58) Field of Classification Search
CPC .. E05D 3/02; E05D 5/062; E05F 15/63; B60J 5/0468; B60J 5/0473; B62D 65/06; E05Y 2201/626; E05Y 2600/45; E05Y 2900/531
See application file for complete search history.

(56) References Cited

U.S. PATENT DOCUMENTS

| 2,229,315 | A | * | 1/1941 | Sullivan | E05D 3/16 220/817 |
| 2,259,970 | A | * | 10/1941 | Benzick | E05D 5/062 49/386 |
| 2,279,992 | A | * | 4/1942 | Jackson | E05F 1/1261 16/292 |
| 2,479,437 | A | * | 8/1949 | Vigmostad | E05F 1/1276 16/289 |
| 2,902,710 | A | * | 9/1959 | Gessler | E05F 1/1276 16/286 |
| 3,766,600 | A | * | 10/1973 | Little | E05F 1/1261 16/85 |

(Continued)

FOREIGN PATENT DOCUMENTS

FR 3003230 A1 * 9/2014 ............... E05D 5/06

*Primary Examiner* — Chuck Y Mah
(74) *Attorney, Agent, or Firm* — Slater Matsil, LLP

(57) ABSTRACT

In accordance with an embodiment, a hinge system for a door of vehicle includes a hinge arm configured to be mounted between a vehicle door enclosing a vehicle compartment and a vehicle body frame surround a wall structure that defines the vehicle compartment; and a hinge shaft configured to provide an axis of rotation of the hinge arm, and configured to be located outside the wall structure.

20 Claims, 18 Drawing Sheets

(56) References Cited

U.S. PATENT DOCUMENTS

| | | | | |
|---|---|---|---|---|
| 4,295,245 A * | 10/1981 | Malcom | E05D 11/1014 | 16/80 |
| 4,658,473 A * | 4/1987 | Schema | E05F 1/1261 | 16/382 |
| 4,947,516 A * | 8/1990 | Kretchman | D06F 39/14 | 16/289 |
| 5,235,725 A * | 8/1993 | Rees | E05F 1/1207 | 16/306 |
| 5,243,738 A * | 9/1993 | Kiefer | E05F 1/1207 | 16/300 |
| 5,401,096 A * | 3/1995 | Stang | A47B 41/02 | 49/386 |
| 5,967,586 A * | 10/1999 | Duffy | E05D 7/0045 | 296/76 |
| 6,230,364 B1 * | 5/2001 | Cheal | E05D 3/145 | 16/288 |
| 6,269,521 B1 * | 8/2001 | Gabel | E05F 1/1276 | 16/361 |
| 6,382,704 B1 * | 5/2002 | Nastasoiu | E05D 7/06 | 296/76 |
| 6,401,299 B1 * | 6/2002 | Schwarz | E05D 11/06 | 16/361 |
| 6,447,043 B1 * | 9/2002 | VandenHeuvel | E05D 3/10 | 49/386 |
| 6,618,904 B1 * | 9/2003 | Nagy | E05F 1/1292 | 16/370 |
| 7,147,266 B2 * | 12/2006 | Huntsman | E05C 17/042 | 296/146.1 |
| 7,147,267 B2 * | 12/2006 | Bittner | E05F 15/63 | 49/335 |
| 7,536,748 B2 * | 5/2009 | Renke | E05F 1/1276 | 16/289 |
| 7,730,584 B2 * | 6/2010 | Duffy | E05D 5/062 | 16/295 |
| 8,607,416 B2 * | 12/2013 | Krajenke | E05F 1/1238 | 16/297 |
| 8,615,847 B2 * | 12/2013 | Krajenke | E05F 1/1284 | 296/76 |
| 8,740,281 B2 * | 6/2014 | Binder | F16F 1/16 | 296/76 |
| 9,016,773 B2 * | 4/2015 | Tanner | E05D 11/10 | 296/193.11 |
| 9,062,488 B2 | 6/2015 | Sasaki | | |
| 9,248,871 B1 * | 2/2016 | Waskie | E05C 17/36 | |
| 9,316,036 B2 * | 4/2016 | Collene | E05F 5/08 | |
| 10,704,311 B1 * | 7/2020 | Collene | E05F 1/1261 | |
| 11,072,952 B2 * | 7/2021 | Elkasevic | E05D 11/06 | |
| 11,261,638 B2 * | 3/2022 | Song | E05F 3/20 | |
| 2003/0167598 A1 * | 9/2003 | Koestler | E05F 1/1215 | 16/289 |
| 2004/0088826 A1 * | 5/2004 | Schlegel | E05F 1/1284 | 16/366 |
| 2005/0150078 A1 * | 7/2005 | Bittner | E05F 15/614 | 16/221 |
| 2005/0172453 A1 * | 8/2005 | Duffy | E05D 5/062 | 16/307 |

* cited by examiner

HINGE SYSTEM FOR VEHICLE DOOR

CROSS-REFERENCE TO RELATED APPLICATIONS

This application claims the benefit of Korean Patent Application No. 10-2022-0079812, filed on Jun. 29, 2022, which application is hereby incorporated herein by reference.

TECHNICAL FIELD

The present disclosure generally relates to a hinge system for a vehicle door.

BACKGROUND

A vehicle includes various vehicle compartments such as a passenger compartment, a front compartment, and a luggage compartment. The vehicle includes a vehicle door enclosing the vehicle compartment, and a hinge mechanism mounted between the vehicle door and a vehicle body. The vehicle door may have various structures such as a swing door, a gull-wing door, a tailgate, a decklid, and a trunklid. The vehicle door may pivot using the hinge mechanism.

The hinge mechanism includes a hinge bracket, and a hinge arm pivotally mounted to the hinge bracket through a hinge pin. The hinge bracket may be mounted on the vehicle body through fasteners and/or the like, and the hinge arm may be mounted on the vehicle door through fasteners and/or the like. The hinge arm may pivot around the hinge pin to allow the vehicle door to open and close.

The vehicle door may be divided into a manual vehicle door driven manually by a user and an electric vehicle door driven by an actuator such as a motor. In particular, the electric vehicle door may include a hinge actuator driving the hinge arm of the vehicle hinge mechanism, and the hinge actuator may be connected to the hinge arm. As the hinge arm pivots by the hinge actuator, the electric vehicle door may be opened and closed.

The decklid enclosing the luggage compartment located on the rear of the vehicle may be pivotally connected to the vehicle body through the hinge mechanism including a gooseneck hinge arm. The gooseneck hinge arm may allow the decklid to move from a fully open position to a fully closed position. The gooseneck hinge arm may be pivotally mounted through the hinge bracket mounted on the vehicle body, and a swing drive mechanism and an extension spring may be connected to the gooseneck hinge arm. As a motor and a body of the swing drive mechanism rotate, the gooseneck hinge arm may rotate. Accordingly, the decklid may pivot, and the extension spring may support a drive torque of the swing drive mechanism.

In the existing hinge mechanism, however, as the swing drive mechanism, the gooseneck hinge arm, and the extension spring are located in the luggage compartment, loss of space in the luggage compartment may occur. In addition, as the gooseneck hinge arm rotates around the aperture periphery of the luggage compartment, a radius of rotation of the gooseneck hinge arm may relatively increase. Furthermore, as the entirety of the swing drive mechanism rotates, an operating space of the swing drive mechanism may relatively increase.

The above information described in this background section is provided to assist in understanding the background of the inventive concept, and may include any technical concept which is not considered as the prior art that is already known to those skilled in the art.

SUMMARY

An aspect of the present disclosure provides a hinge system for a vehicle door having a hinge arm, a hinge actuator, and the like located outside a vehicle compartment, thereby significantly reducing loss of space in the vehicle compartment.

According to an aspect of the present disclosure, a hinge system for a vehicle door may include: a wall structure defining a vehicle compartment; a vehicle door enclosing the vehicle compartment; a vehicle body frame structure surrounding the periphery of the wall structure; a hinge arm mounted between the vehicle door and the vehicle body frame structure; and a hinge shaft providing an axis of rotation of the hinge arm, and located outside the wall structure.

The hinge arm may be located outside the wall structure.

The hinge system may further include an extension spring connected between the hinge arm and the vehicle body frame structure. The extension spring may be located outside the wall structure.

The vehicle body frame structure may include a transverse frame and a longitudinal member surrounding the wall structure. The transverse frame may have a transverse member, and the extension spring may include a first hook connected to the hinge arm, and a second hook connected to the transverse member.

The hinge system comprising a hinge actuator driving the hinge arm. The hinge actuator may be located outside the wall structure.

The vehicle body frame structure may include a transverse frame and a longitudinal member surrounding the wall structure, and the hinge actuator may be mounted on the longitudinal member.

The hinge system may further include a hinge bracket mounted on the longitudinal member. The hinge arm may be rotatably connected to the hinge bracket through the hinge shaft.

The hinge actuator and the hinge bracket may be located adjacent to an intersection point between the transverse frame and the longitudinal member.

The hinge actuator may be fixed to the hinge bracket.

The hinge arm may include: a base rotatably connected to the hinge bracket through the hinge shaft; a first extension extending from the base toward the vehicle door; and a second extension extending from the base toward the vehicle body frame structure.

The first extension may be connected to the vehicle door, and the second extension may be connected to the vehicle body frame structure through an extension spring.

The hinge actuator may include a rotatable output shaft, and an output link extending from the output shaft along the first extension of the hinge arm. The output link may include a first end portion fixed to the output shaft, and a second end portion fixed to the first extension of the hinge arm.

The first extension may have a recessed portion adjacent to a top end of an exterior skin of the vehicle, and the recessed portion may be recessed toward the interior of the vehicle.

The first extension may include: a proximal straight section extending straightly from a first end portion of the base; a proximal curved section curved at a predetermined radius from the proximal straight section; a middle straight section extending straightly from the proximal curved section; a distal curved section curved at a predetermined radius from the middle straight section; and a distal straight section extending straightly from the distal curved section. The recessed portion may be defined by the proximal straight section, the proximal curved section, and the middle straight section.

An end portion of the second extension of the hinge arm may be closer to the exterior skin than the hinge shaft when the vehicle door is in a fully closed position. The extension spring may be connected to the end portion of the second extension.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
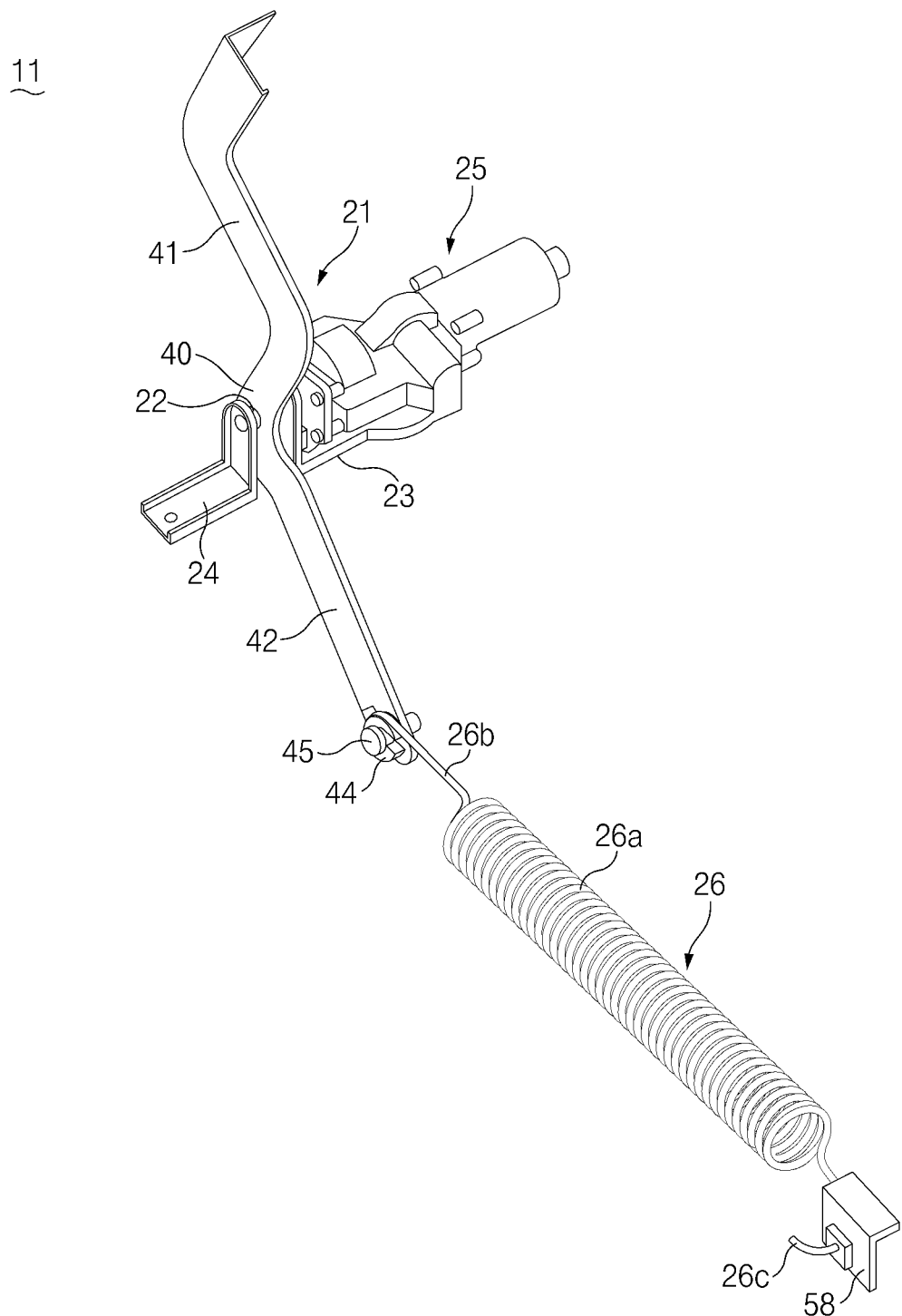
FIG. 1 illustrates a perspective view of a hinge assembly of a hinge system for a vehicle door according to an exemplary embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of aft, and are not to be interpreted as having ideal or excessively formal meanings unless clearly defined as having such in the present application.

Embodiments of the present disclosure generally relate to a hinge system for a vehicle door. Some embodiments are directed to a hinge system for a vehicle door enclosing a vehicle compartment.

Referring to FIG. 1, a hinge system for a vehicle door according to an exemplary embodiment of the present disclosure may include a hinge assembly 11. The hinge assembly 11 may include hinge brackets 23 and 24, a hinge arm 21 rotatably connected to the hinge brackets 23 and 24 through a hinge shaft 22, a hinge actuator 25 driving the hinge arm 21, and an extension spring 26 connected to the hinge arm 21.

Figure 2:
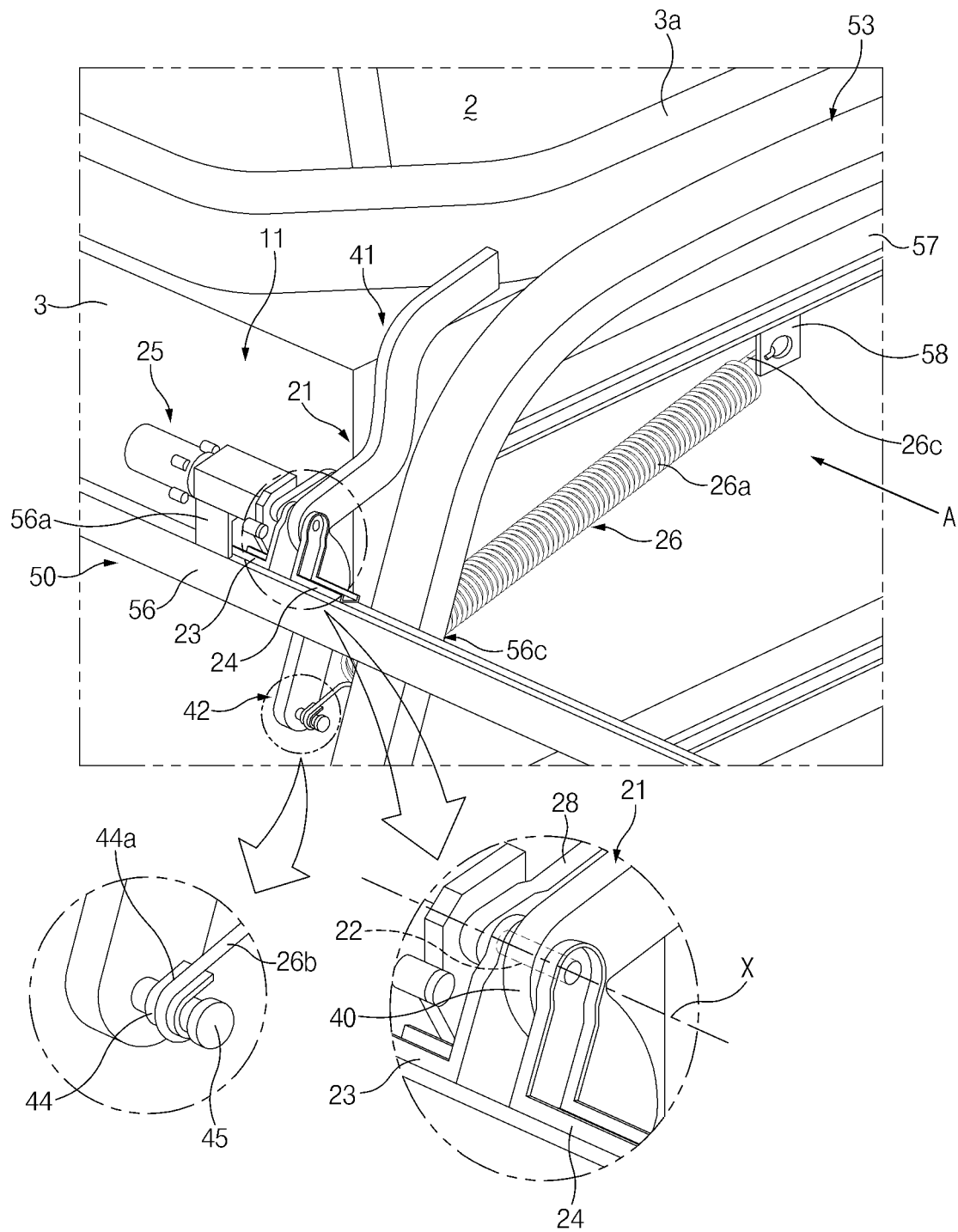
FIG. 2 illustrates a hinge system for a vehicle door according to an exemplary embodiment of the present disclosure.

Referring to FIG. 2, a first hinge bracket 23 and a second hinge bracket 24 may be fixed to a vehicle body frame structure 50, and the first hinge bracket 23 may be spaced apart from the second hinge bracket 24. The first hinge bracket 23 may be adjacent to the hinge actuator 25, and the second hinge bracket 24 may be relatively far from the hinge actuator 25. The hinge arm 21 may be rotatably mounted between the first hinge bracket 23 and the second hinge bracket 24 through the hinge shaft 22.

According to an alternative exemplary embodiment, only the first hinge bracket 23 adjacent to the hinge actuator 25 may be fixed to the vehicle body frame structure 50, and the second hinge bracket 24 may be removed. The hinge arm 21 may be rotatably connected to the first hinge bracket 23 through the hinge shaft 22.

Figure 3:
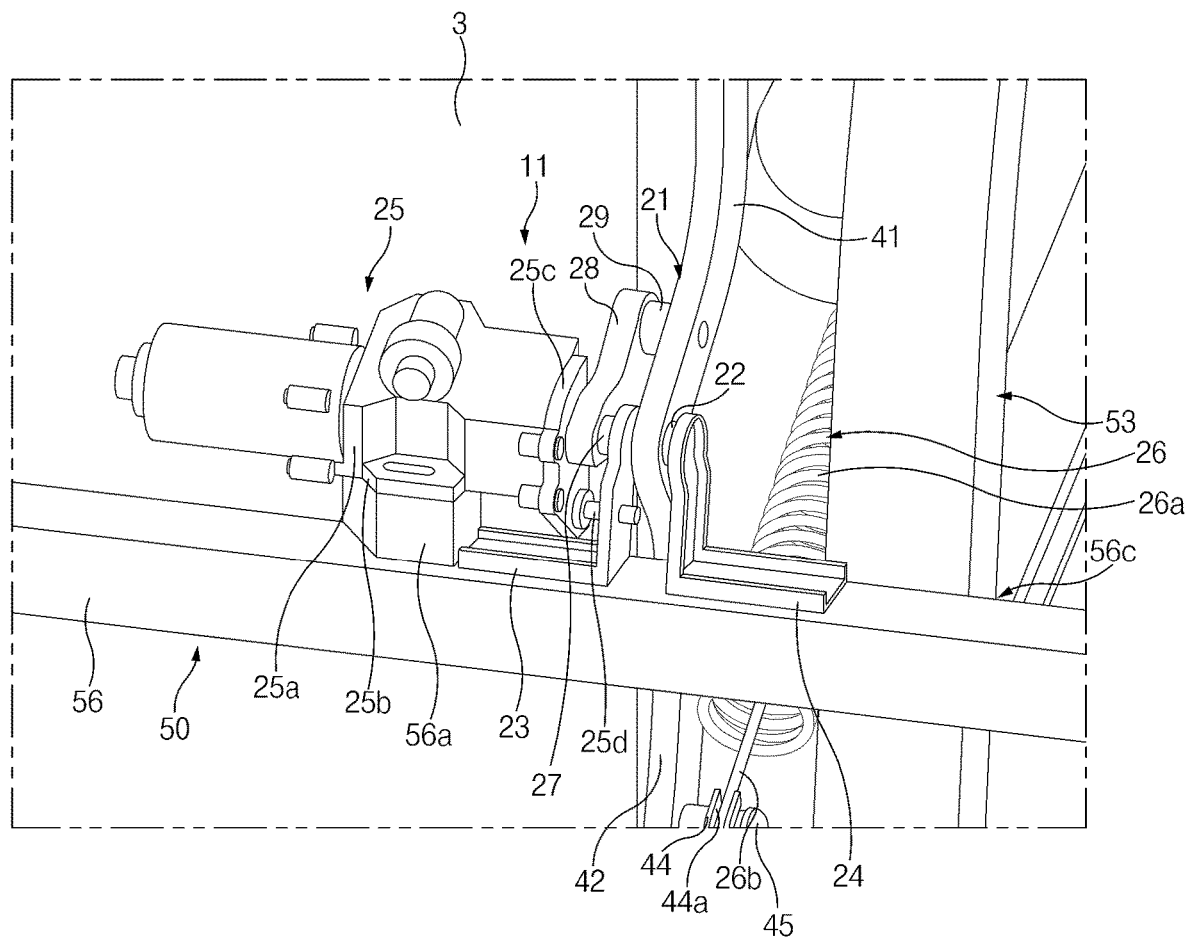
FIG. 3 illustrates an enlarged view of a hinge assembly illustrated in FIG. 2.

Referring to FIGS. 2 and 3, the hinge arm 21 may include a base 40 rotatably connected to the hinge brackets 23 and 24 through the hinge shaft 22, a first extension 41 extending from the base 40 toward a vehicle door 5, and a second extension 42 extending from the base 40 toward the vehicle body frame structure 50. The first extension 41 and the second extension 42 may extend from the base 40 in opposite directions, and the hinge arm 21 may have various shapes such as a V-like shape, an L-like shape, and an M-like shape. The hinge shaft 22 may provide an axis of rotation on which the hinge arm 21 rotates, and the hinge arm 21 may rotate or swing around the hinge shaft 22.

The hinge actuator 25 may include an actuator housing 25a, and a bidirectional motor and a geartrain embedded in the actuator housing 25a. Referring to FIGS. 2 and 3, the hinge actuator 25 may be fixedly mounted on the vehicle body frame structure 50 and the first hinge bracket 23. The hinge actuator 25 may be fixed to the vehicle body, and the hinge actuator 25 may directly rotate the hinge arm 21 so that a mounting space of the hinge actuator 25 may be relatively reduced.

Referring to FIG. 3, the actuator housing 25a of the hinge actuator 25 may be fixedly mounted on a longitudinal member 56 of the vehicle body frame structure 50. The longitudinal member 56 of the vehicle body frame structure 50 may have a mounting projection 56a, and a mounting lug 25b of the actuator housing 25a may be fixed to the mounting projection 56a using fasteners, welding, and/or the like. In addition, an end plate 25c of the actuator housing 25a may be fixed to the first hinge bracket 23 using a fastener 25d, welding, and/or the like.

Referring to FIG. 3, the hinge actuator 25 may include a rotatable output shaft 27, and an output link 28 extending from the output shaft 27 along the first extension 41 of the hinge arm 21. The output link 28 may include a first end portion fixed to the output shaft 27, and a second end portion fixed to the first extension 41 of the hinge arm 21. The second end portion of the output link 28 may be fixed to the first extension 41 of the hinge arm 21 through a connection member 29. The connection member 29 may be fixed to the output link 28 and the first extension 41 of the hinge arm 21 so that the connection member 29 may connect the output link 28 and the first extension 41 of the hinge arm 21, and the connection member 29 may be spaced apart from the hinge shaft 22 by a predetermined distance. As the output shaft 27 is rotated by the hinge actuator 25, the output link 28 may rotate together with the output shaft 27. The rotation of the output link 28 may cause the hinge arm 21 to rotate around the hinge shaft 22. An axis of the output shaft 27 may be aligned with an axis X of rotation of the hinge shaft 22.

The extension spring 26 may be configured to absorb and store energy, and to provide a resistance to a pulling force or extension. The extension spring 26 may be connected to the hinge arm 21, and the extension spring 26 may support a drive torque output from the output shaft 27 of the hinge actuator 25. Referring to FIG. 2, the extension spring 26 may include a coil 26a, a first hook 26b provided on one end of the coil 26a, and a second hook 26c provided on the other end of the coil 26a. The first hook 26b may be connected to the second extension 42 of the hinge arm 21, and the second hook 26c may be connected to a fixing lug 58. The fixing lug 58 may be fixed to a transverse member 57 of the vehicle body frame structure 50.

Referring to FIG. 2, a vehicle 1 may have a vehicle compartment 2 such as a passenger compartment, a luggage compartment, and/or a front compartment. A wall structure 3 may include the vehicle compartment 2 defined therein. In addition, the wall structure 3 may define an aperture, and the vehicle compartment 2 may be accessible through the aperture. A sealing member 3a may be provided on the aperture periphery of the wall structure 3.

Figure 5:
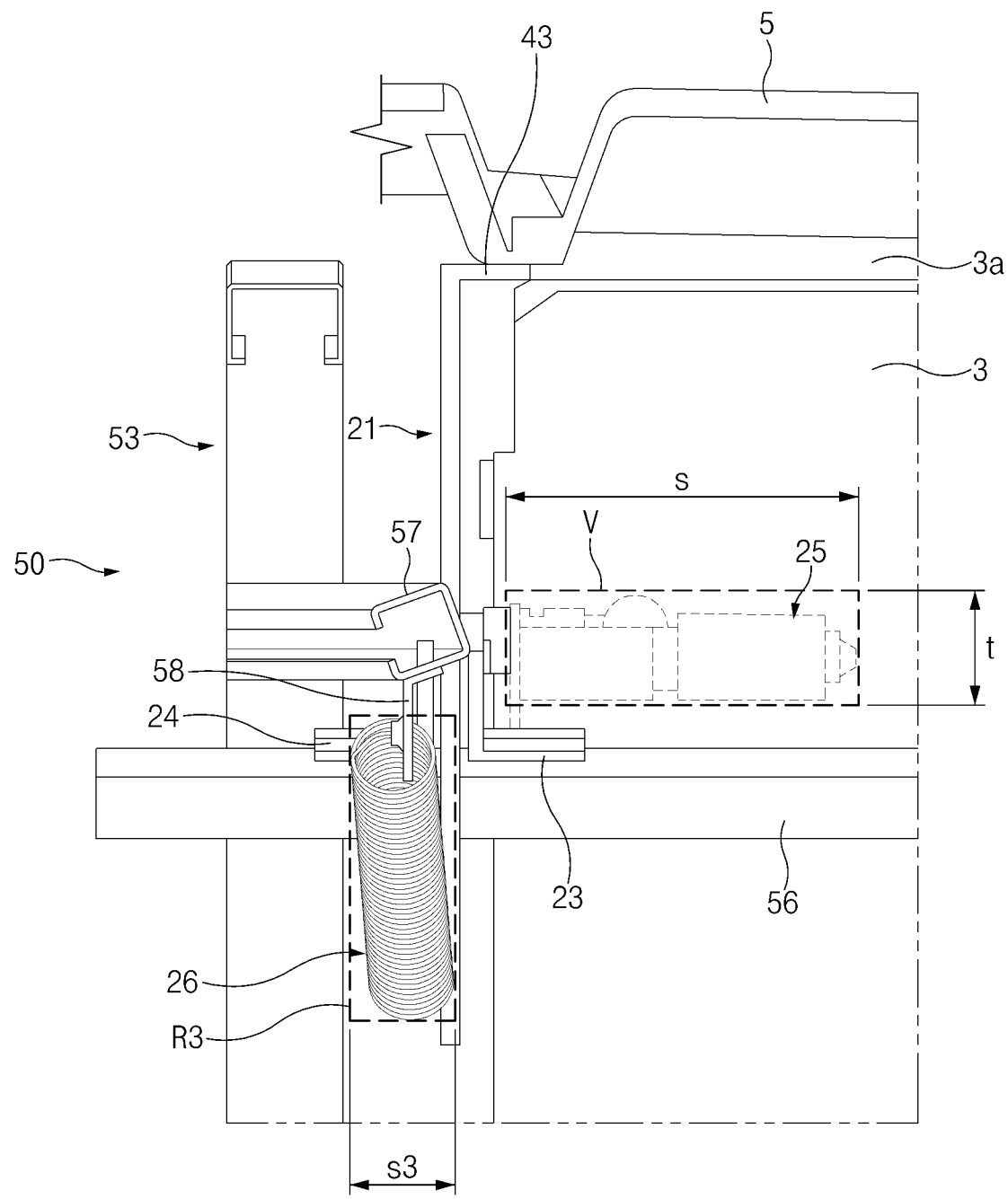
FIG. 5 illustrates a view, which is viewed in a direction indicated by arrow B illustrated in FIG. 4.

The hinge shaft 22, the hinge brackets 23 and 24, the hinge arm 21, the hinge actuator 25, and the extension spring 26 of the hinge assembly 11 may be located outside the wall structure 3. As the hinge assembly 11 is located outside the wall structure 3, the hinge assembly 11 may not be located in the vehicle compartment 2 so that loss of space in the vehicle compartment 2 may be minimized. In particular, the hinge assembly 11 may be spaced apart from the wall structure 3 so that a radius of rotation of the hinge arm may be relatively reduced. Accordingly, the size, shape, and the like of the hinge arm 21 may be varied, and thus the degrees of freedom in design of the hinge arm 21 may be improved. In addition, the hinge actuator 25 may be fixed to the vehicle body and the hinge brackets 23 and 24, and the hinge actuator 25 may rotate the hinge arm 21 through the output link 28 and the connection member 29 so that the volume and mounting space of the hinge actuator 25 may be significantly reduced. Referring to FIG. 5, the hinge actuator 25 may have a predetermined mounting space V, and the mounting space V of the hinge actuator 25 may have a predetermined length s and a predetermined height t. For example, the length s of the mounting space V may be approximately 200 mm, and the height t of the mounting space V may be approximately 50 mm.

Referring to FIGS. 2 and 3, the vehicle body frame structure 50 may surround the wall structure 3, and the hinge assembly 11 may be disposed between the vehicle body frame structure 50 and the wall structure 3. The hinge brackets 23 and 24 and the hinge actuator 25 may be fixed to the longitudinal member 56 of the vehicle body frame structure 50 using fasteners, welding, and/or the like, and the extension spring 26 may be connected between the hinge arm 21 and the transverse member 57 of the vehicle body frame structure 50 so that the hinge assembly 11 may be compactly disposed between the vehicle body frame structure 50 and the wall structure 3.

Figure 4:
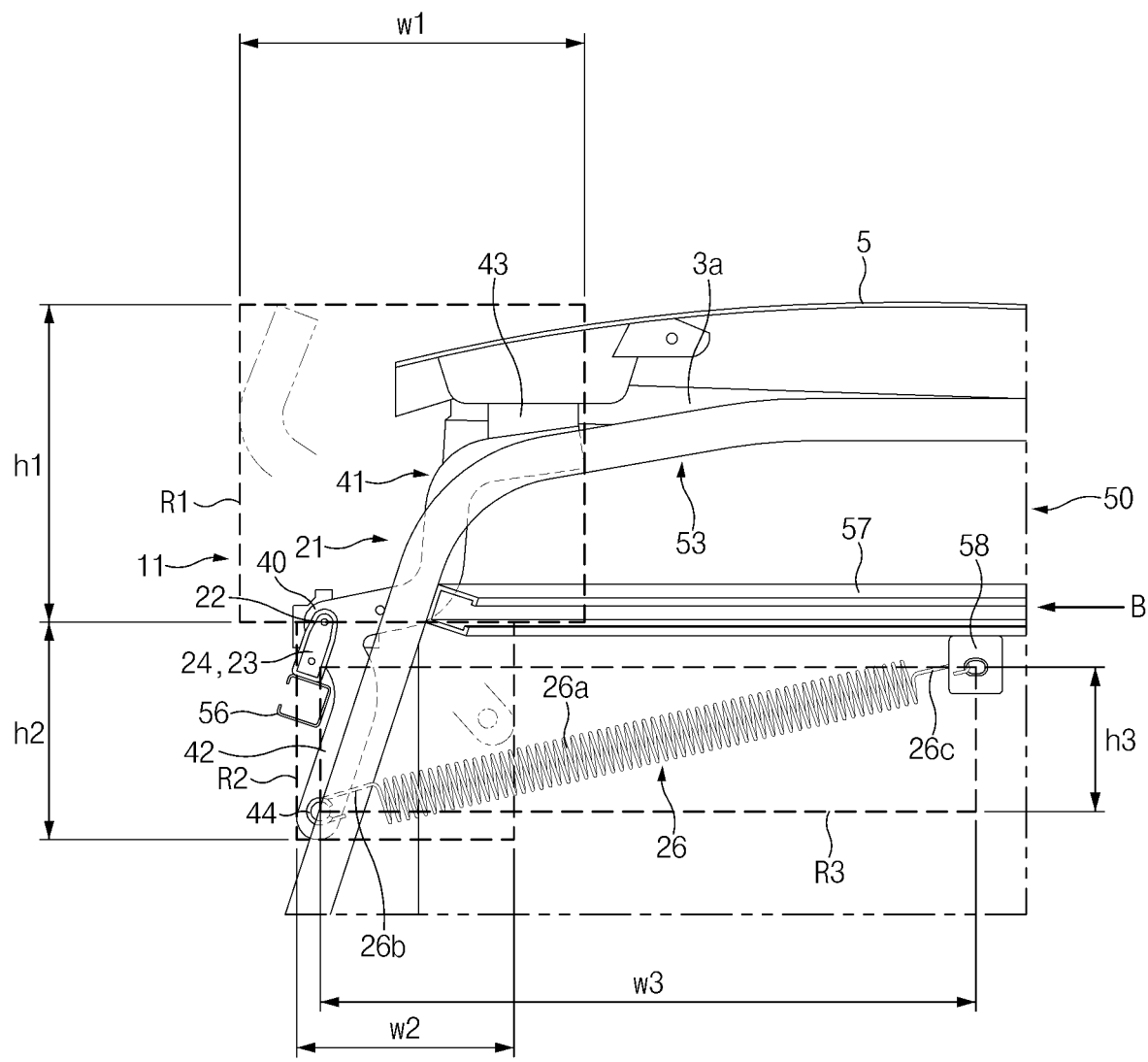
FIG. 4 illustrates a state in which a vehicle door is closed by a hinge system for a vehicle door according to an exemplary embodiment of the present disclosure, which is viewed in a direction indicated by arrow A illustrated in FIG. 2.
Figure 6:
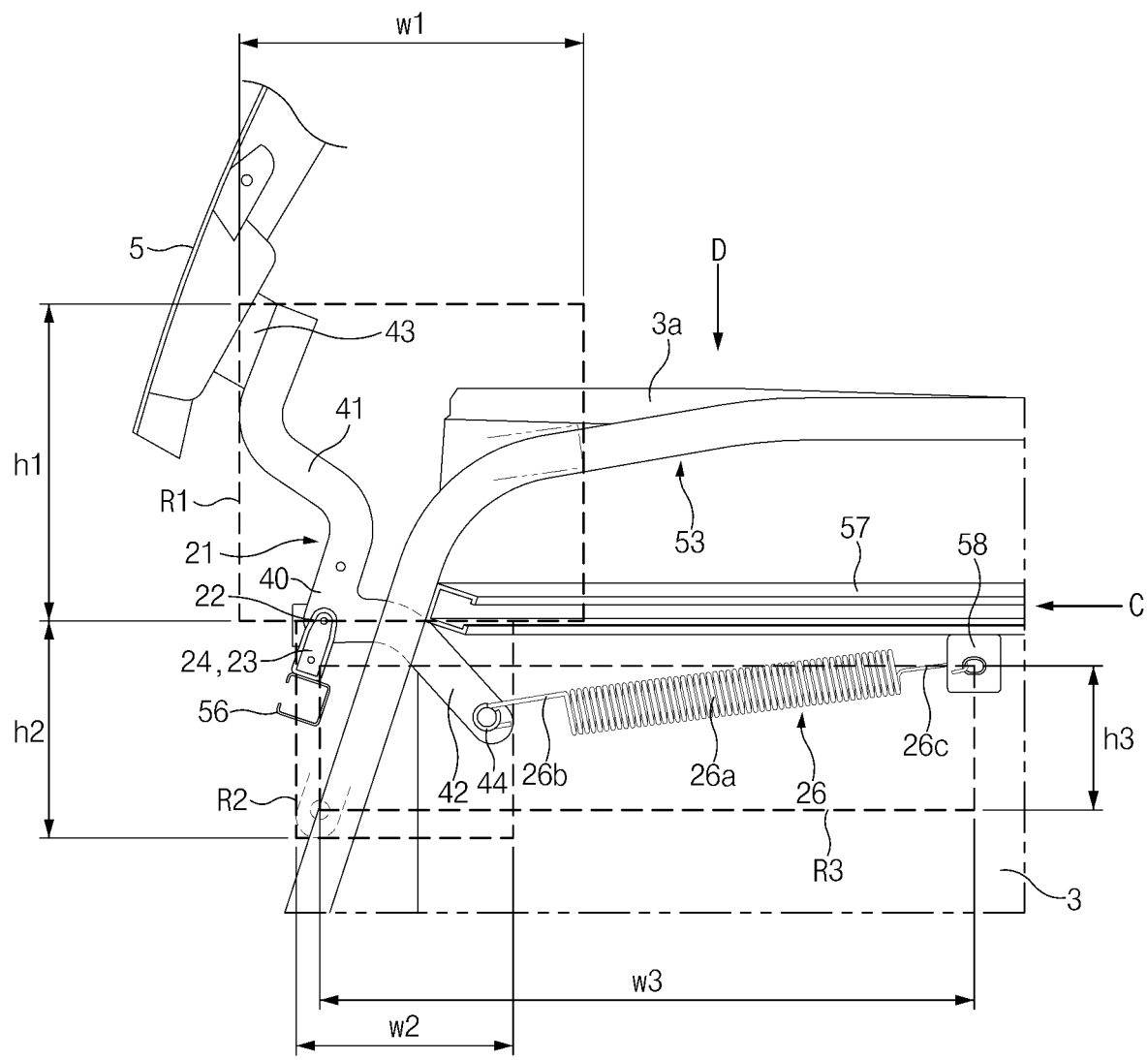
FIG. 6 illustrates a state in which a vehicle door is opened by a hinge system for a vehicle door according to an exemplary embodiment of the present disclosure, which is viewed in a direction indicated by arrow A illustrated in FIG. 2.

The hinge arm 21 may move between a first position (see FIG. 4) and a second position (see FIG. 6) by the hinge actuator 25. Referring to FIG. 4, the first position may be a position in which the first extension 41 of the hinge arm 21 moves close to the wall structure 3, and the second extension 42 of the hinge arm 21 moves away from the wall structure 3. Referring to FIG. 6, the second position may be a position in which the first extension 41 of the hinge arm 21 moves away from the wall structure 3, and the second extension 42 of the hinge arm 21 moves close to the wall structure 3.

Referring to FIG. 4, the first extension 41 of the hinge arm 21 may be connected to the vehicle door 5, and the second extension 42 of the hinge arm 21 may be connected to the vehicle body frame structure 50 through the extension spring 26. The first extension 41 may have a mounting portion 43 provided on an end portion thereof, and the mounting portion 43 may be fixed to the vehicle door 5 using fasteners, welding, and/or the like. Referring to FIG. 2, the second extension 42 may include an engaging member 44 provided on an end portion thereof, and the engaging member 44 may have a C-like shape. The engaging member 44 may be fixed to the end portion of the second extension 42 through a fastener 45 such as a screw. The engaging member 44 may have a recess 44a extending along the circumference thereof. The first hook 26b of the extension spring 26 may be engaged in the recess 44a of the engaging member 44.

Referring to FIGS. 4 and 5, when the hinge arm 21 moves to the first position, the vehicle door 5 may move to a fully closed position. When the vehicle door 5 is in the fully closed position, the vehicle door 5 may tightly come into contact with the sealing member 3a of the wall structure 3, and accordingly the vehicle compartment 2 may be enclosed by the wall structure 3 and the vehicle door 5.

Figure 7:
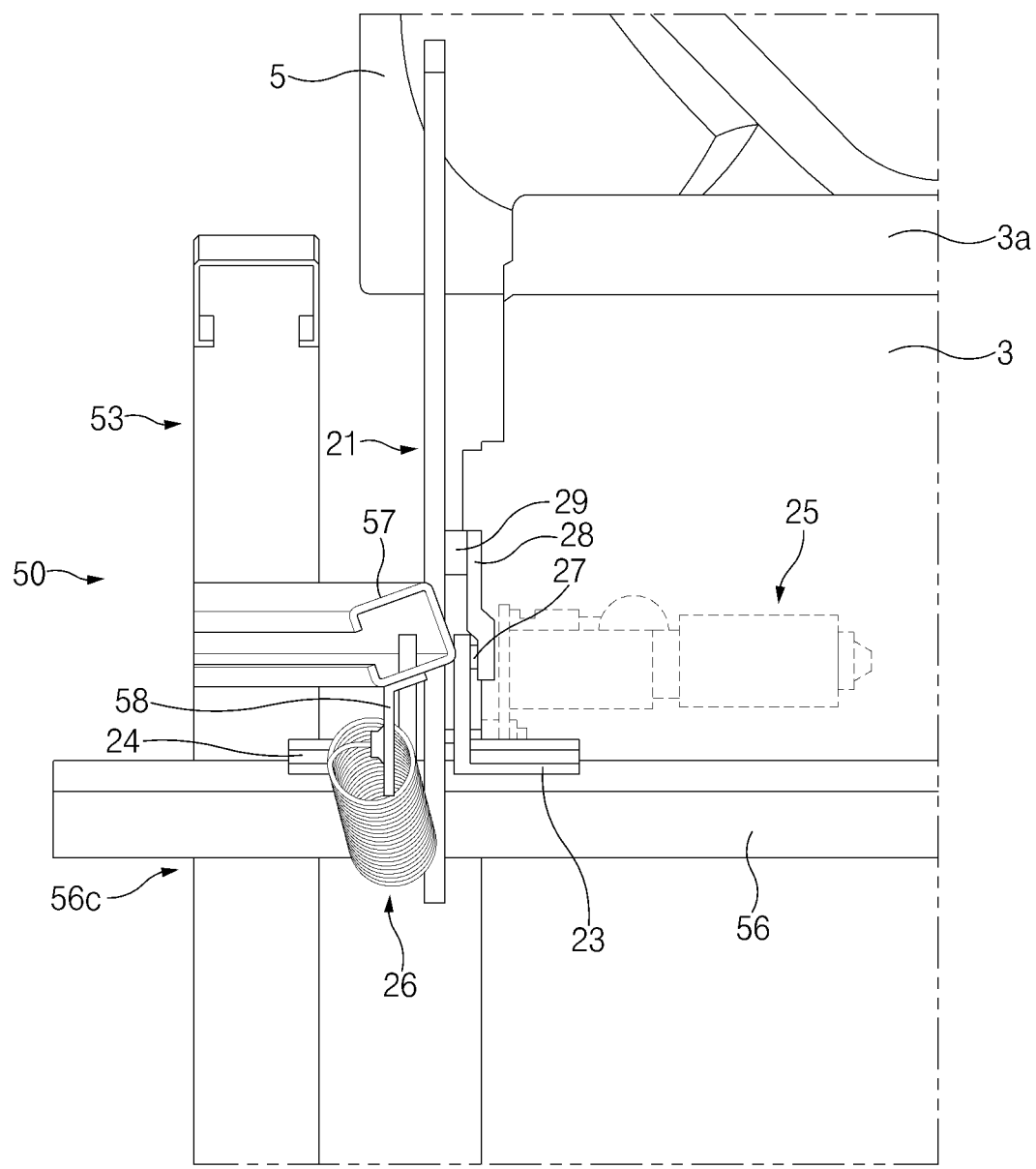
FIG. 7 illustrates a view, which is viewed in a direction indicated by arrow C illustrated in FIG. 6.

Referring to FIGS. 6 and 7, when the hinge arm 21 moves to the second position, the vehicle door 5 may move to a fully open position. When the vehicle door 5 is in the fully open position, the vehicle door 5 may be spaced apart from the sealing member 3a of the wall structure 3, and accordingly the vehicle compartment 2 may be accessible through the aperture.

Figure 8:
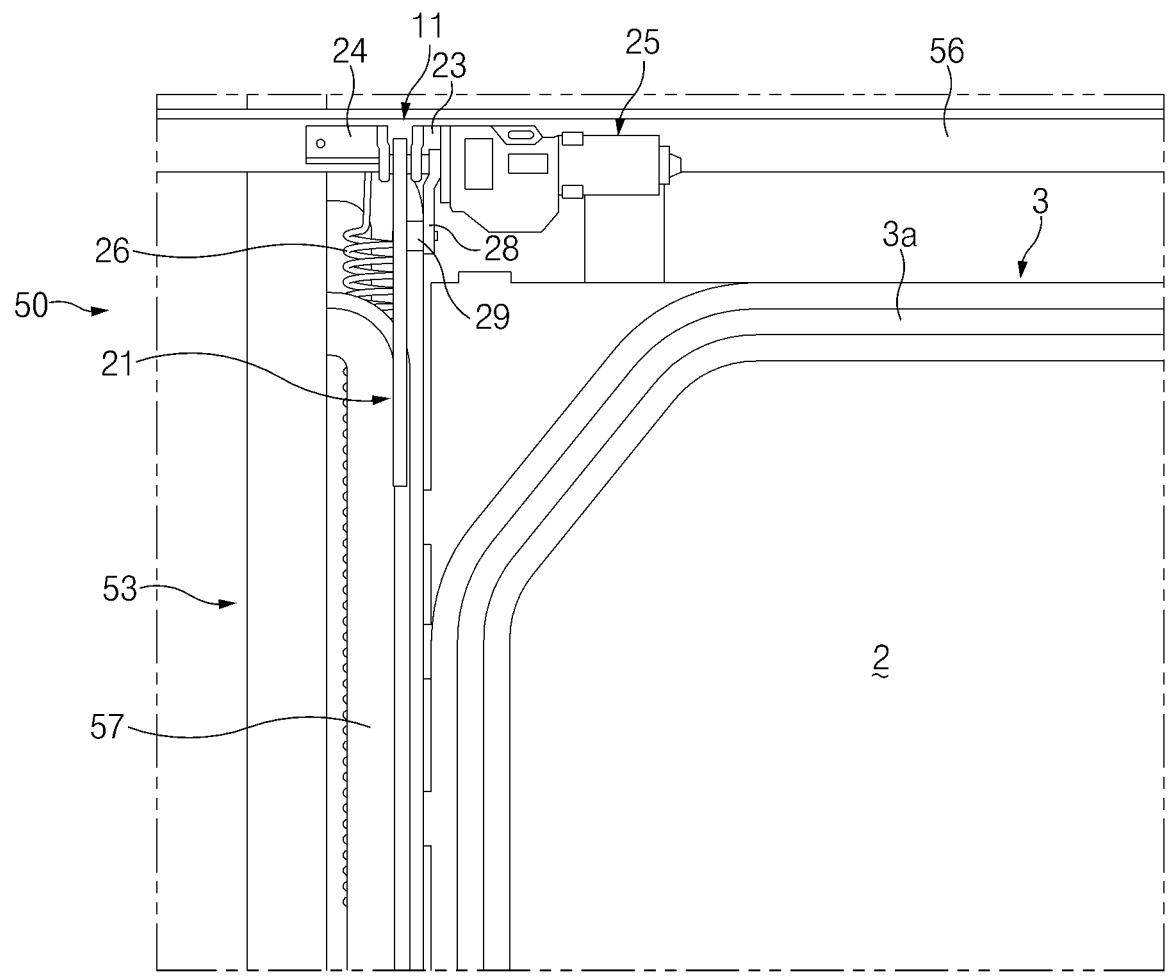
FIG. 8 illustrates a view, which is viewed in a direction indicated by arrow D illustrated in FIG. 6.

Referring to FIG. 8, the hinge assembly 11 may be spaced apart from the wall structure 3, and the hinge assembly 11 may be mounted on the vehicle body frame structure 50. Accordingly, the hinge assembly 11 may be disposed between the wall structure 3 and the vehicle body frame structure 50.

Referring to FIGS. 4 and 6, the first extension 41 of the hinge arm 21 may rotate around the hinge shaft 22 in a predetermined operating space R1, and the second extension 42 of the hinge arm 21 may rotate around the hinge shaft 22 in a predetermined operating space R2. In particular, the second extension 42 may be located on the opposite of the first extension 41 with respect to the hinge shaft 22, and accordingly the operating space R2 of the second extension 42 may be located on the opposite of the operating space R1 of the first extension 41 with respect to the hinge shaft 22. The operating space R2 of the second extension 42 may have a predetermined width w2 and a predetermined height h2. As the second extension 42 is located on the opposite of the first extension 41 with respect to the hinge shaft 22, the length of the second extension 42 may be significantly reduced, and the operating space R2 of the second extension 42 may be significantly reduced. For example, the width w2 of the operating space R2 may be approximately 170 mm, and the height h2 of the operating space R2 may be approximately 170 mm.

Referring to FIGS. 4 and 6, as the second extension 42 of the hinge arm 21 rotates around the hinge shaft 22, the extension spring 26 may be extended or compressed in a predetermined operating space R3. The operating space R3 of the extension spring 26 may be determined based on the length of the second extension 42, the location of the transverse member 57, the locations of the hinge brackets 23 and 24, the location of the hinge shaft 22, and/or the like.

FIGS. 9 to 12 illustrate examples of the vehicle 1, the vehicle compartment 2, the wall structure 3, and the vehicle body frame structure 50 to which the hinge system for a vehicle door according to an exemplary embodiment of the present disclosure is applied.

Figure 9:
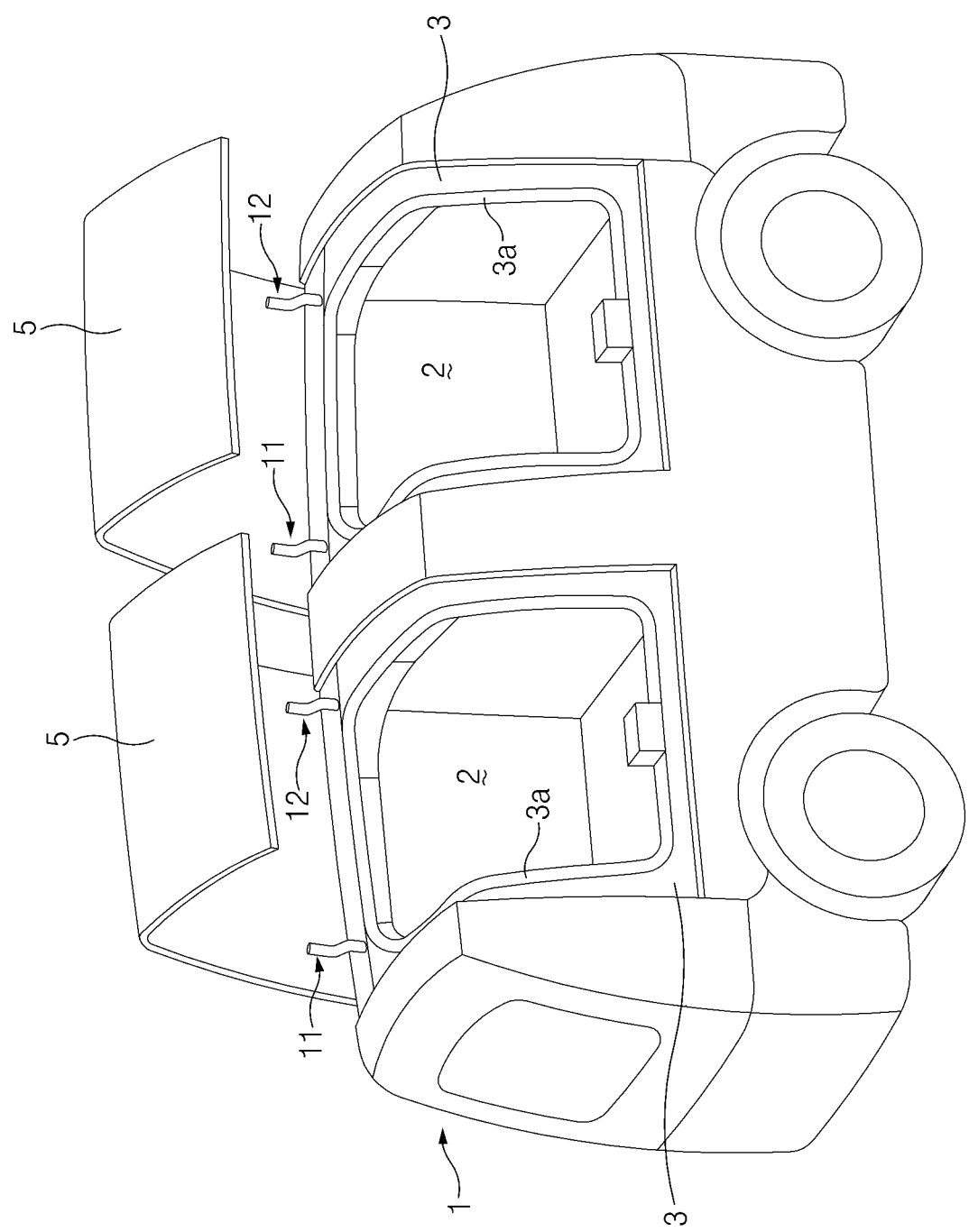
FIG. 9 illustrates a perspective view of a vehicle to which a hinge system for a vehicle door according to an exemplary embodiment of the present disclosure is applied.

Referring to FIG. 9, the vehicle 1 may include the vehicle compartment 2, and the vehicle door 5 enclosing the vehicle compartment 2. For example, the vehicle compartment 2 may be a passenger compartment, a luggage compartment, a front compartment, and/or the like. The vehicle door 5 may be any one of various doors such as a swing door, a gull-wing door, a tailgate, a decklid, and a trunk lid.

Figure 10:
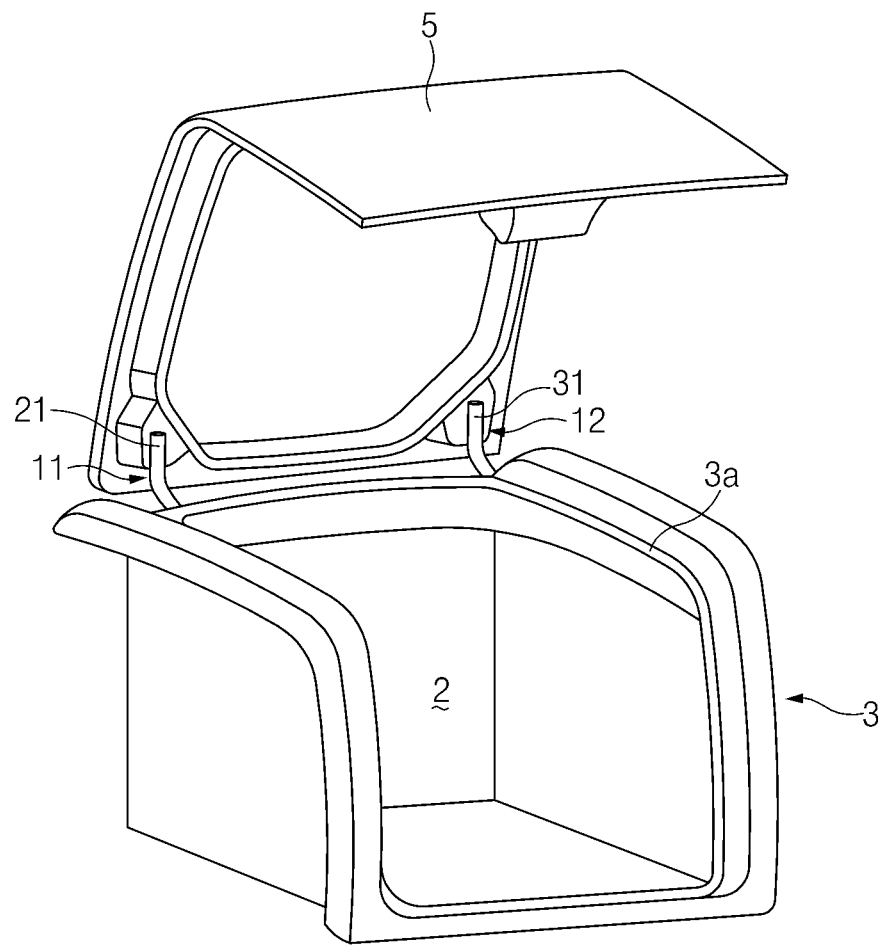
FIG. 10 illustrates a vehicle door and a wall structure defining a vehicle component illustrated in FIG. 9.

The vehicle 1 illustrated in FIG. 9 may be a purpose built vehicle (PBV). The vehicle 1 may include two vehicle compartments 2 corresponding to the passenger compartment, two vehicle doors 5 enclosing the two vehicle compartments 2, and two wall structures 3 defining the two vehicle compartments 2. The two wall structures 3 may be arranged along a longitudinal direction of the vehicle. Referring to FIG. 10, each wall structure 3 may define the corresponding vehicle compartment 2, and the wall structure 3 may include the sealing member 3a provided on the aperture periphery of the wall structure 3.

Figure 11:
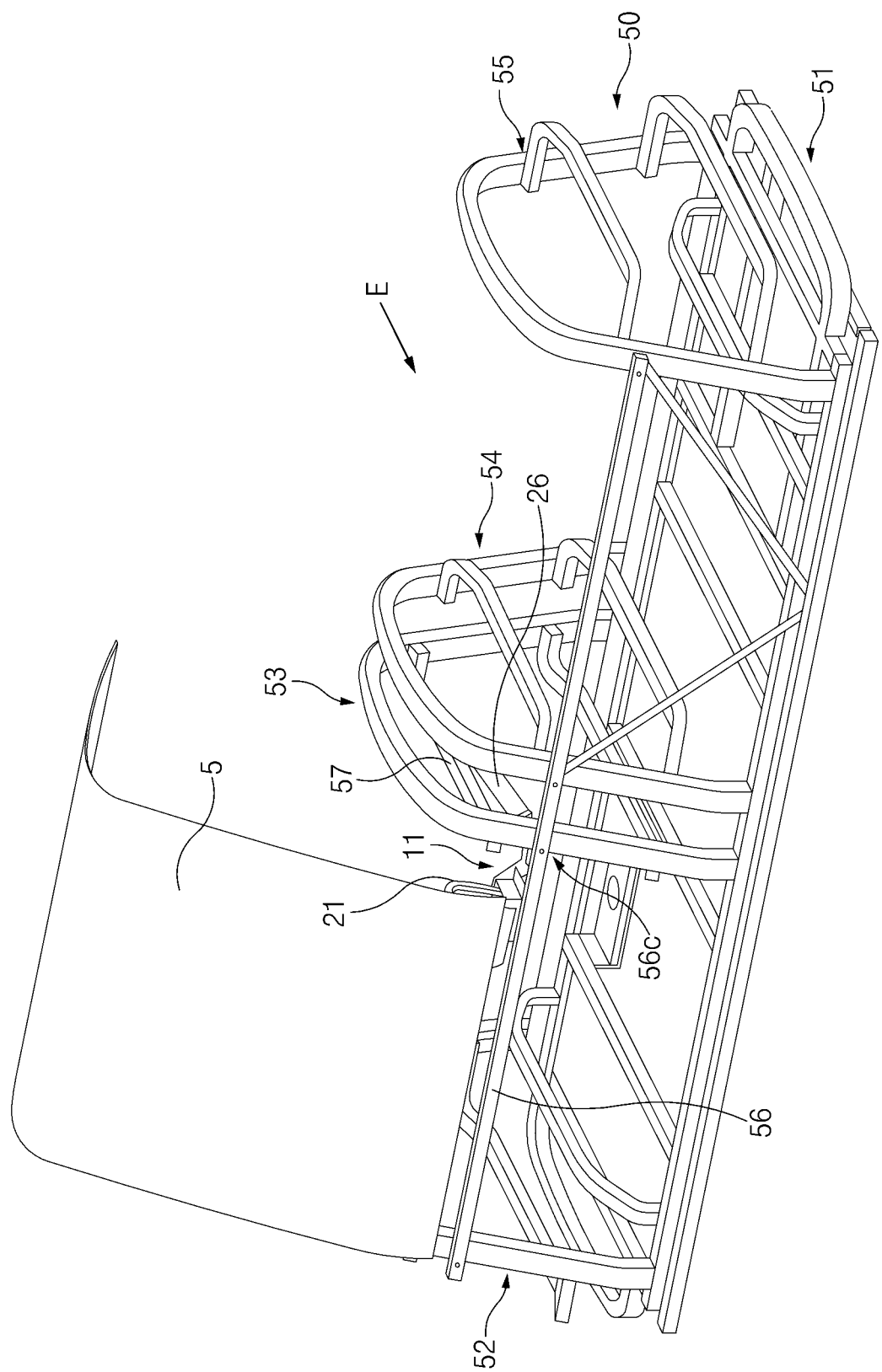
FIG. 11 illustrates a vehicle body frame structure of a hinge system for a vehicle door according to an exemplary embodiment of the present disclosure.
Figure 12:
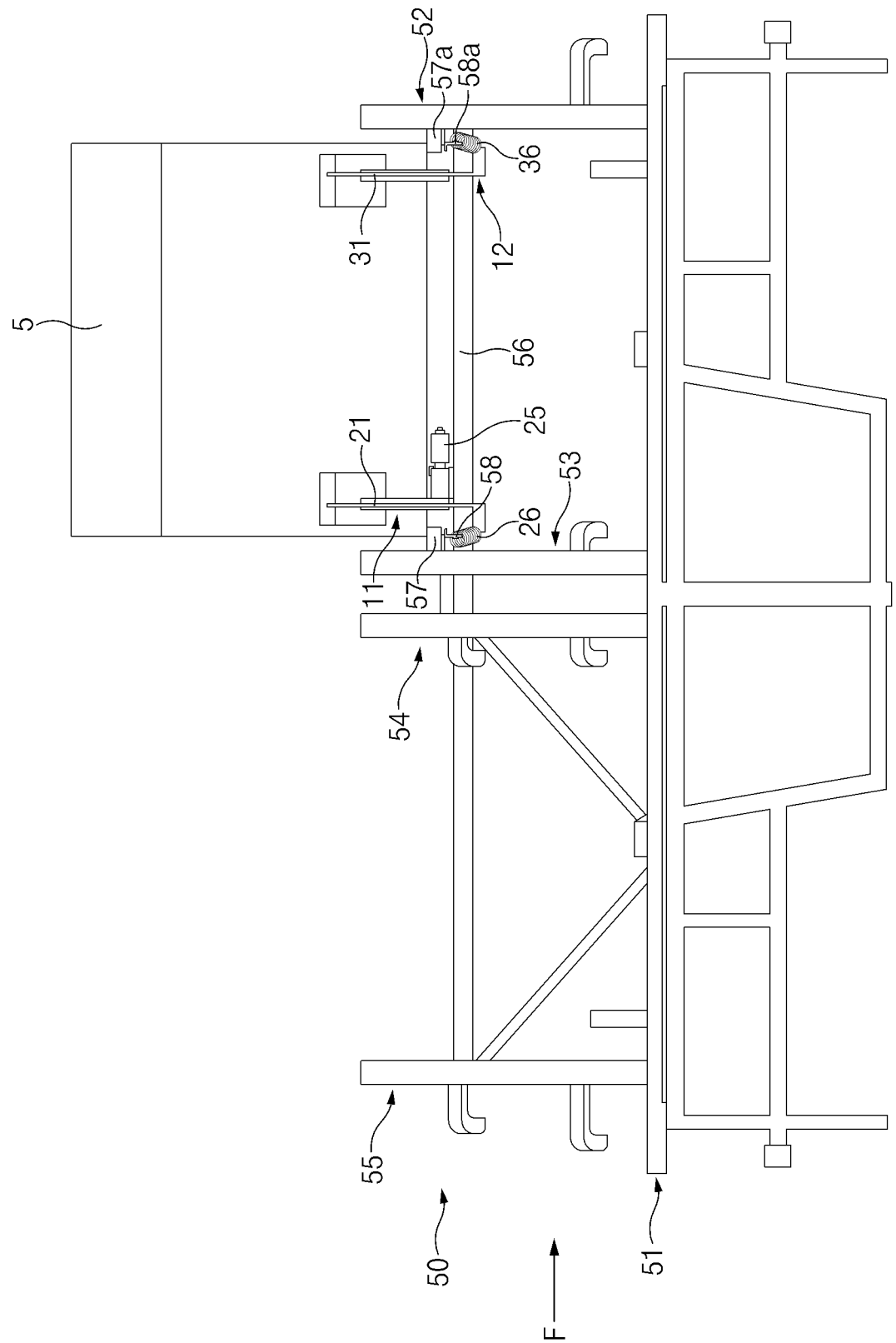
FIG. 12 illustrates a view, which is viewed in a direction indicated by arrow E illustrated in FIG. 11.

The vehicle body frame structure 50 may support the hinge assembly 11. Referring to FIGS. 11 and 12, the vehicle body frame structure 50 may include a bottom frame 51, a plurality of transverse frames 52, 53, 54, and 55 provided on the bottom frame 51, and the longitudinal member 56 extending along the longitudinal direction of the vehicle 1.

Each of the transverse frames 52, 53, 54, and 55 may be arranged in a width direction of the vehicle 1, and the plurality of transverse frames 52, 53, 54, and 55 may be spaced apart from each other in the longitudinal direction of the vehicle 1. The longitudinal member 56 may extend along the longitudinal direction of the vehicle 1 across the plurality of transverse frames 52, 53, 54, and 55, and accordingly the longitudinal member 56 may intersect with the plurality of transverse frames 52, 53, 54, and 55.

Two transverse frames 52 and 53 of the plurality of transverse frames 52, 53, 54, and may be spaced apart from each other by a distance corresponding to the length of one wall structure 3, and accordingly the two transverse frames 52 and 53 may be located on the front and rear of one wall structure 3. Two transverse frames 54 and 55 of the plurality of transverse frames 52, 53, 54, and 55 may be spaced apart from each other by a distance corresponding to the length of the other wall structure 3, and accordingly the two transverse frames 54 and 55 may be located on the front and rear of the other wall structure 3.

As described above, the bottom frame 51, the plurality of transverse frames 52, 53, 54, and 55, and the longitudinal member 56 may be arranged to enclose the wall structure 3. Accordingly, the hinge assembly 11 may be disposed between the vehicle body frame structure and the wall structure 3. Referring to FIGS. 2 and 3, the hinge assembly 11 may be mounted on a predetermined portion of the longitudinal member 56 adjacent to an intersection point 56c between the transverse frame 53 adjacent to one sidewall of the wall structure 3 and the longitudinal member 56, and the hinge brackets 23 and 24 of the hinge assembly 11 may be fixed to the longitudinal member 56 using fasteners, welding, and/or the like so that the hinge assembly 11 may be firmly supported to the vehicle body frame structure 50 located outside the wall structure 3.

Referring to FIG. 2, the transverse frame 53 adjacent to one sidewall of the wall structure 3 may have the transverse member 57. The transverse member 57 may extend along the width direction of the vehicle 1, and an axis of the transverse member 57 may be perpendicular to an axis of the longitudinal member 56. The hinge arm 21 may be rotatably mounted with respect to the longitudinal member 56 through the hinge brackets 23 and 24 and the hinge shaft 22, and the hinge arm 21 may rotate on a virtual plane perpendicular to the axis of the longitudinal member 56. The first hook 26b of the extension spring 26 may be connected to a bottom end of the second extension 42 of the hinge arm 21, and the second hook 26c of the extension spring 26 may be connected to the transverse member 57 so that an axis of the extension spring 26 may be perpendicular to the axis of the longitudinal member 56. As the transverse member 57 is located higher than the longitudinal member 56, the coil 26a of the extension spring 26 may extend obliquely from the second hook 26c toward the first hook 26b.

Referring to FIG. 12, the vehicle door 5 may be rotatably connected to the vehicle body frame structure 50 through a pair of hinge assemblies 11 and 12. Accordingly, the vehicle door 5 may rotate through the pair of hinge assemblies 11 and 12 so that the vehicle door 5 may cover or uncover the aperture of the vehicle compartment 2. The pair of hinge assemblies 11 and 12 may include a master hinge assembly or powered actuated hinge assembly 11 operated by the hinge actuator 25, and a slave hinge assembly 12 cooperative with the operation of the master hinge assembly 11. The master hinge assembly 11 and the slave hinge assembly 12 may be spaced apart from each other.

Referring to FIGS. 13 to 16, an exterior skin 7 forming the vehicle body may be located outside the vehicle body frame structure 50, and the vehicle door 5 may rotate relative to the exterior skin 7.

Figure 13:
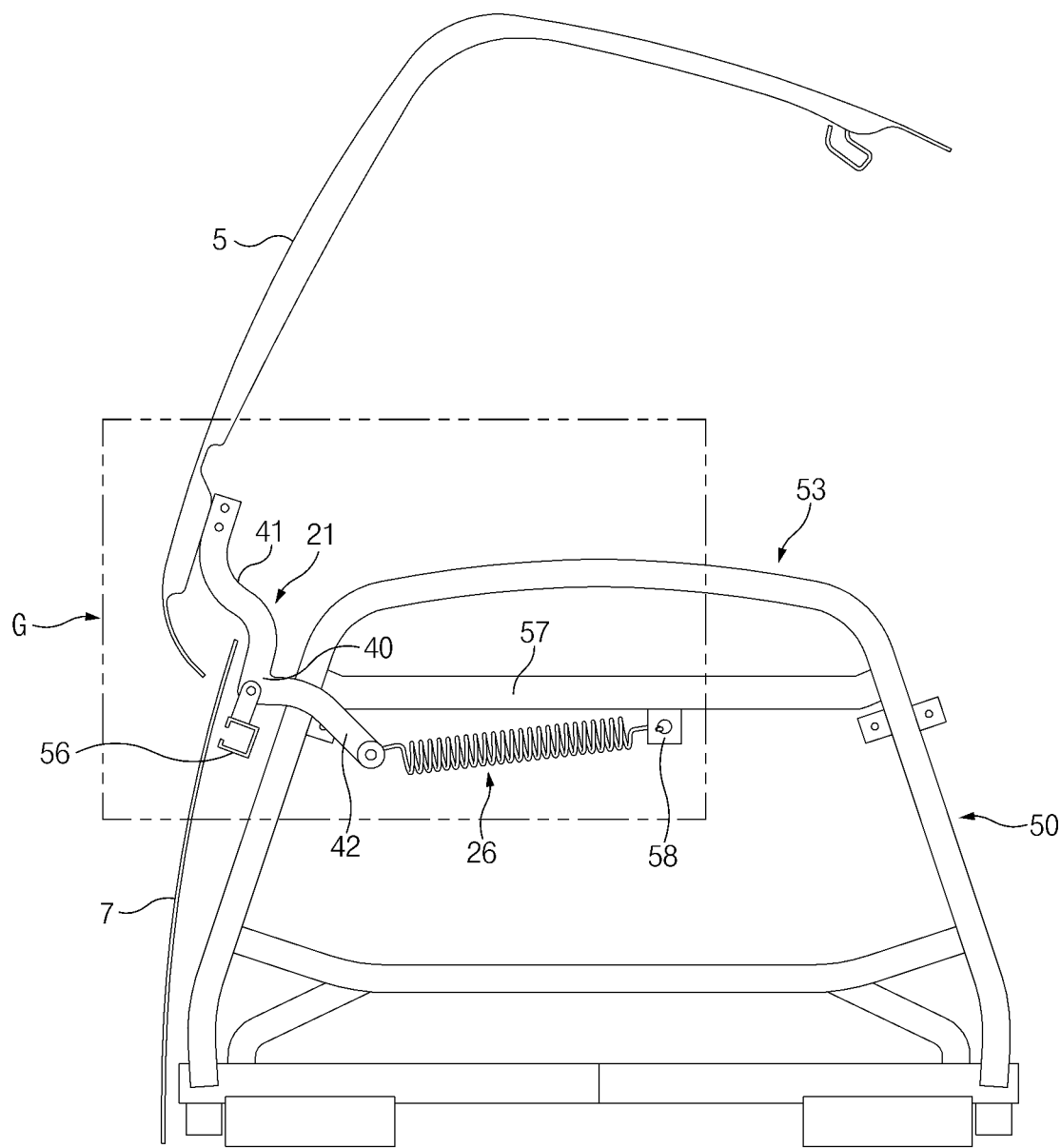
FIG. 13 illustrates a view, which is viewed in a direction indicated by arrow F illustrated in FIG. 12.
Figure 14:
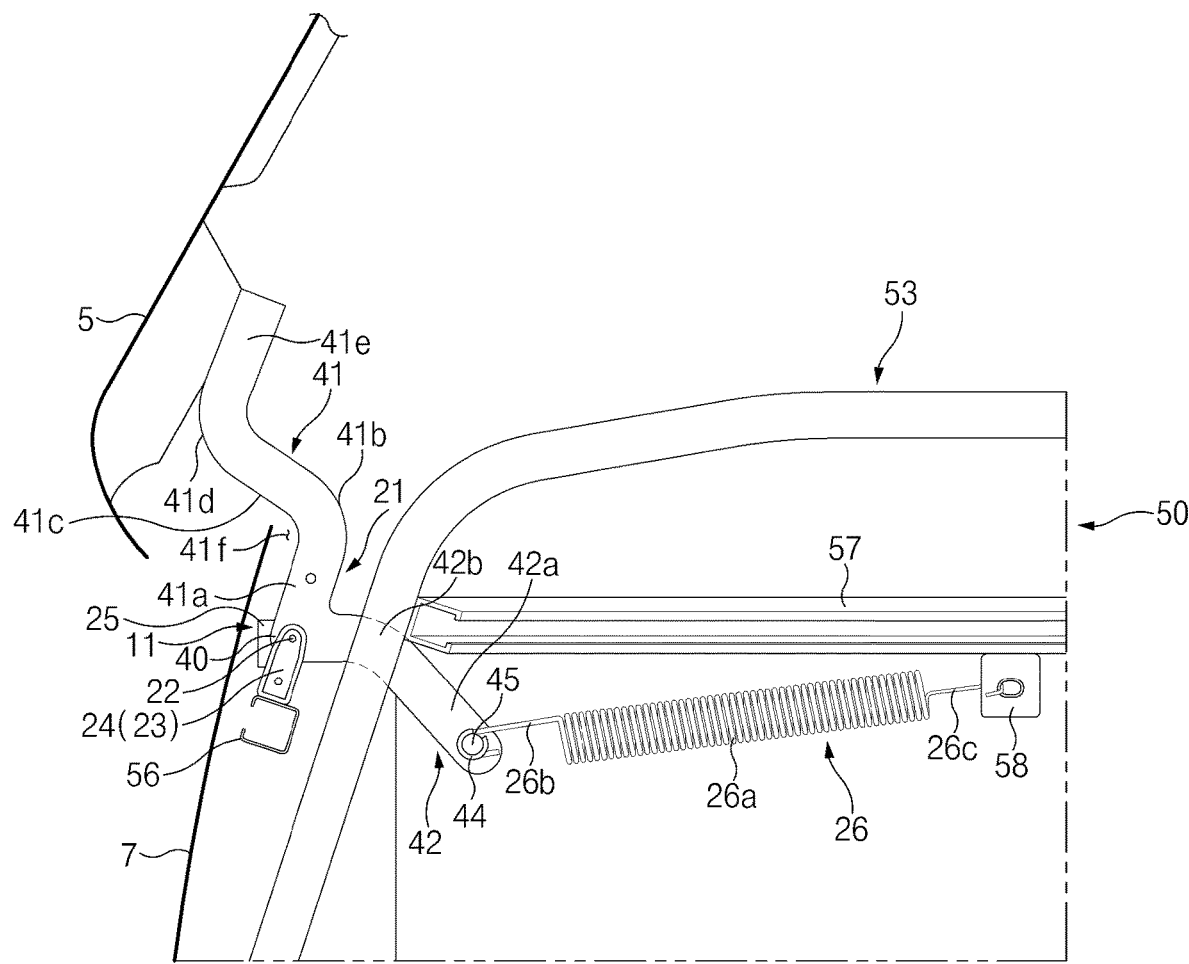
FIG. 14 illustrates an enlarged view of portion G illustrated in FIG. 13.

The hinge arm 21 may move between a first position (see FIGS. 15 and 16) and a second position (see FIGS. 13 and 14).

Referring to FIGS. 13 and 14, the second position may be a position in which the first extension 41 of the hinge arm 21 moves away from the vehicle body frame structure 50, and the second extension 42 of the hinge arm 21 moves close to the vehicle body frame structure 50. When the hinge arm 21 moves to the second position, the vehicle door 5 may move to a fully open position. Referring to FIGS. 6 and 7, when the vehicle door 5 is in the fully open position, the vehicle door 5 may be spaced apart from the sealing member 3a of the wall structure 3, and accordingly the vehicle compartment 2 may be accessible through the aperture of the wall structure 3.

Figure 15:
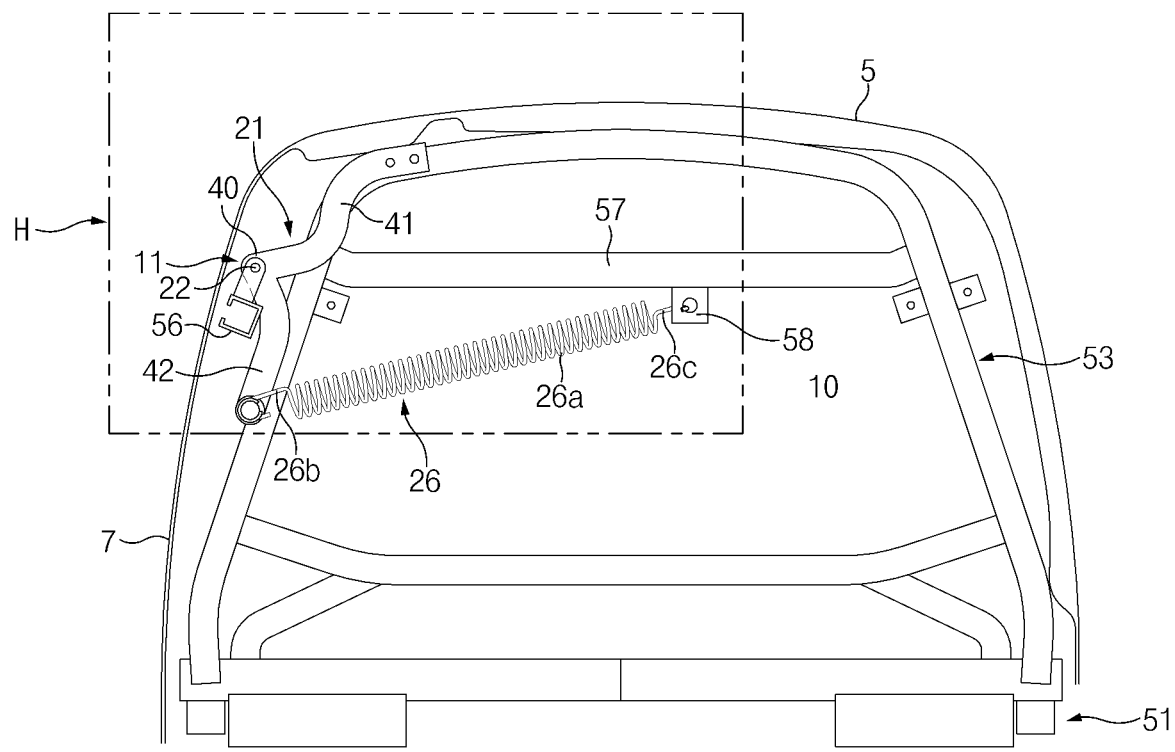
FIG. 15 illustrates a state in which a hinge system for a vehicle door according to an exemplary embodiment of the present disclosure allows a vehicle door to close.
Figure 16:
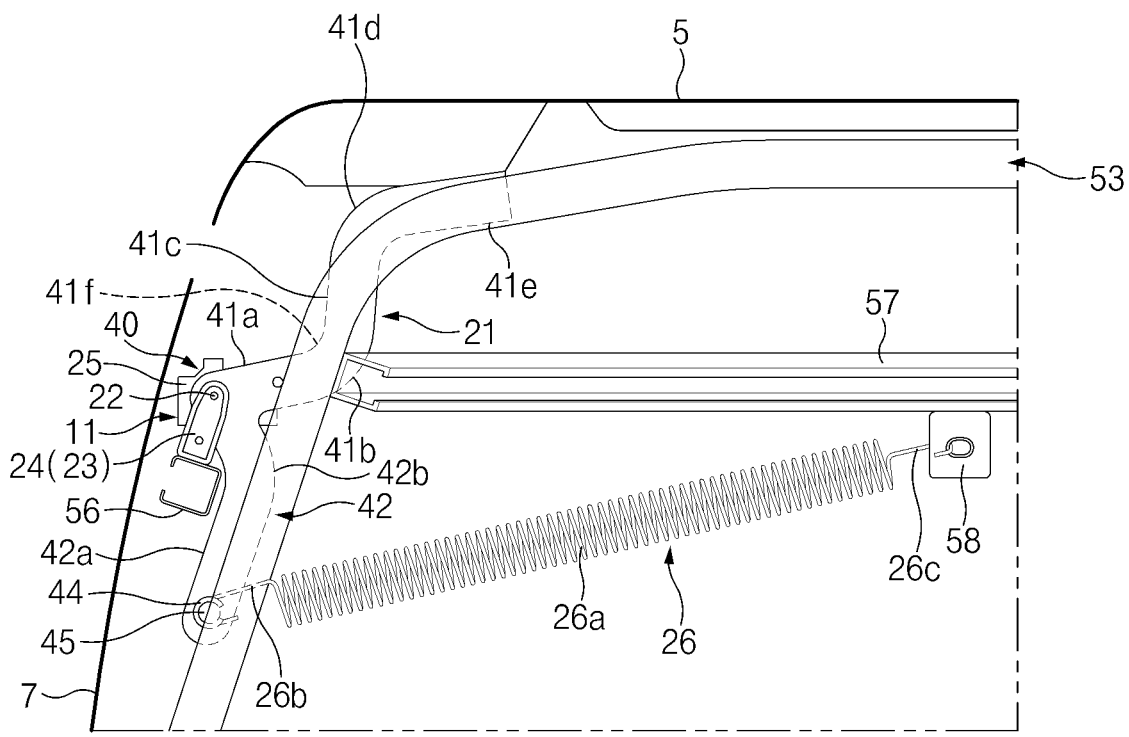
FIG. 16 illustrates an enlarged view of portion H illustrated in FIG. 15.

Referring to FIGS. 15 and 16, the first position may be a position in which the first extension 41 of the hinge arm 21 moves close to the vehicle body frame structure 50, and the second extension 42 of the hinge arm 21 moves away from the vehicle body frame structure 50. When the hinge arm 21 moves to the first position, the vehicle door 5 may move to a fully closed position. Referring to FIGS. 4 and 5, when the vehicle door 5 is in the fully closed position, the vehicle door 5 may tightly come into contact with the sealing member 3a of the wall structure 3, and accordingly the vehicle compartment 2 may be enclosed by the wall structure 3 and the vehicle door 5.

Referring to FIGS. 14 and 16, the base 40 may have a through hole through which the hinge shaft 22 extends, and the base 40 may have a V-like shape angled toward the exterior of the vehicle.

Referring to FIGS. 14 and 16, the first extension 41 may have a recessed portion 41f adjacent to a top end of the exterior skin 7 of the vehicle 1, and the recessed portion 41f may be recessed toward the interior of the vehicle. Specifically, the first extension 41 may include a proximal straight section 41a, a proximal curved section 41b, a middle straight section 41c, a distal curved section 41d, and a distal straight section die. The proximal straight section 41a may extend straightly from a first end portion of the base 40, and the proximal curved section 41b may be curved at a predetermined radius from the proximal straight section 41a. The middle straight section 41c may extend straightly from the proximal curved section 41b. The distal curved section 41d may be curved at a predetermined radius from the middle straight section 41c, and the distal straight section 41e may extend straightly from the distal curved section 41d. The recessed portion 41f may be defined by the proximal straight section 41a, the proximal curved section 41b, and the middle straight section 41c. The distal straight section 41e may be indirectly mounted on the vehicle door 5 through a mounting bracket or the like, or be directly mounted on the vehicle door 5.

Referring to FIGS. 13 and 14, as the hinge arm 21 moves to the second position and the vehicle door 5 is opened, the recessed portion 41f of the first extension 41 may not interfere with the top end of the exterior skin 7 of the vehicle 1. Since the recessed portion 41f of the first extension 41 does not interfere with the top end of the exterior skin 7 of the vehicle 1, a fully open angle (the fully open position) of the vehicle door 5 may be sufficiently gotten.

Referring to FIGS. 14 and 16, the second extension 42 may include a straight section 42a and a curved section 42b.

The curved section 42b may be curved at a predetermined radius from a second end portion of the base 40, and the straight section 42a may extend straightly from the curved section 42b. The engaging member 44 may be fixed to an end portion of the straight section 42a through the fastener 45.

Referring to FIGS. 14 and 16, the first hook 26b of the extension spring 26 may engage with the engaging member 44 so that the second extension 42 may be elastically connected to the transverse member 57 of the vehicle body frame structure 50 through the extension spring 26. The first hook 26b of the extension spring 26 may engage with the end portion of the second extension 42 of the hinge arm 21, and the second hook 26c of the extension spring 26 may engage with the fixing lug 58 of the transverse member 57 of the vehicle body frame structure 50 so that the extension spring 26 may be extended or compressed by the rotation of the hinge arm 21.

Referring to FIG. 14, when the vehicle door 5 is in the fully open position, the end portion of the second extension 42 of the hinge arm 21 may be closer to the fixing lug 58 of the vehicle body frame structure 50 than the hinge shaft 22, and accordingly the extension spring 26 may be compressed.

Referring to FIG. 16, when the vehicle door 5 is in the fully closed position, the end portion of the second extension 42 of the hinge arm 21 may be closer to the exterior skin 7 than the hinge shaft 22, and accordingly the first hook 26b of the extension spring 26 may move close to the exterior skin 7. Thus, the extension spring 26 may sufficiently accumulate elastic energy by making its extension length maximum. That is, when the vehicle door 5 is in the fully closed position, the extension spring 26 may sufficiently accumulate the elastic energy. Then, when the hinge arm 21 moves to the second position by the hinge actuator 25, the extension spring 26 may provide the accumulated elastic energy to the hinge arm 21, thereby supporting the drive torque output from the hinge actuator 25.

Figure 17:
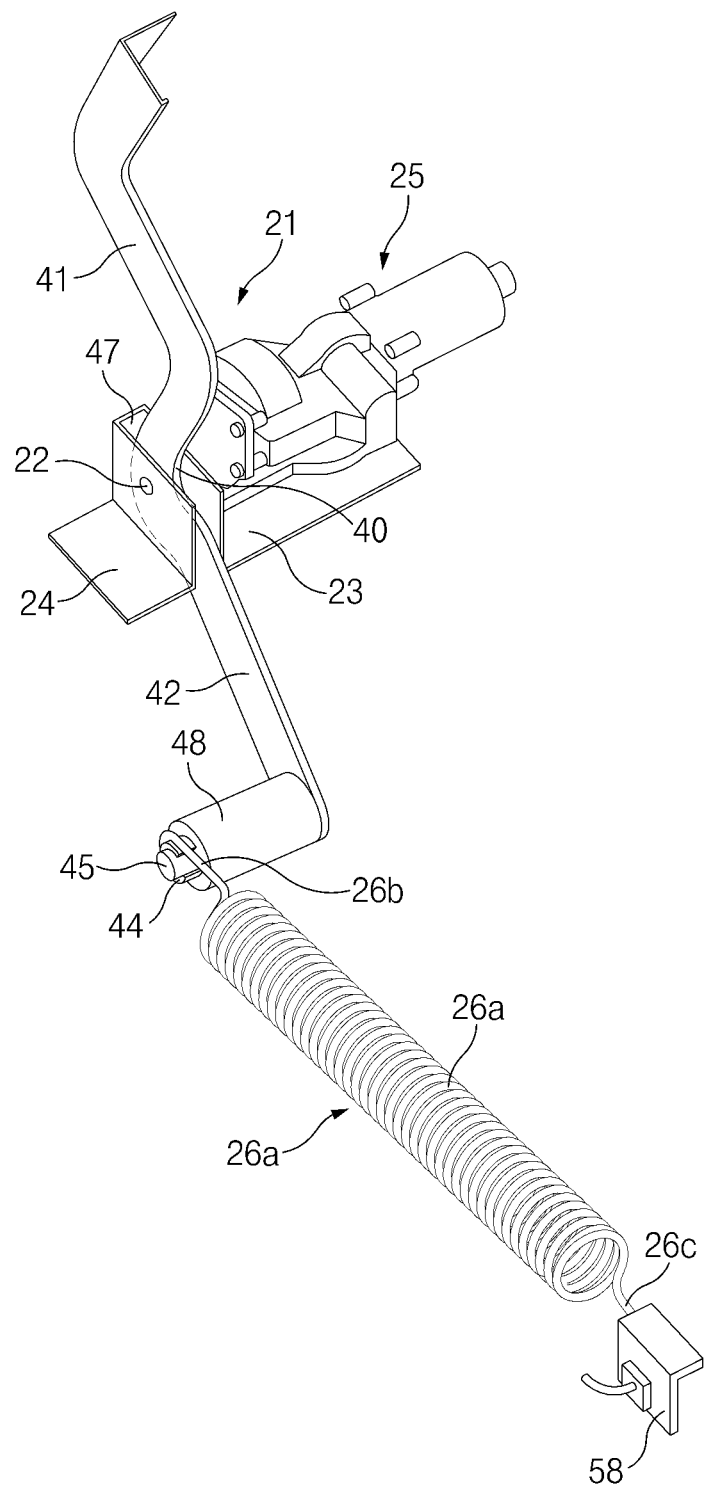
FIG. 17 illustrates a first hinge assembly of a hinge system for a vehicle door according to an exemplary embodiment of the present disclosure.

Referring to FIG. 17, the master hinge assembly 11 may further include a connection portion 47 connecting the two hinge brackets 23 and 24, and a mounting projection 48 provided on the end portion of the second extension 42 of the hinge arm 21. The two hinge brackets 23 and 24 may be integrally connected to each other through the connection portion 47, and the engaging member 44 may be fixed to the mounting projection 48 through the fastener 45. The first hook 26b of the extension spring 26 may engage with the engaging member 44, and the second hook 26c of the extension spring 26 may engage with the fixing lug 58. Referring to FIG. 12, the fixing lug 58 may be fixed to the transverse member 57 of the transverse frame 53, and the extension spring 26 of the master hinge assembly 11 may be connected between the hinge arm 21 and the transverse member 57 of the transverse frame 53.

Figure 18:
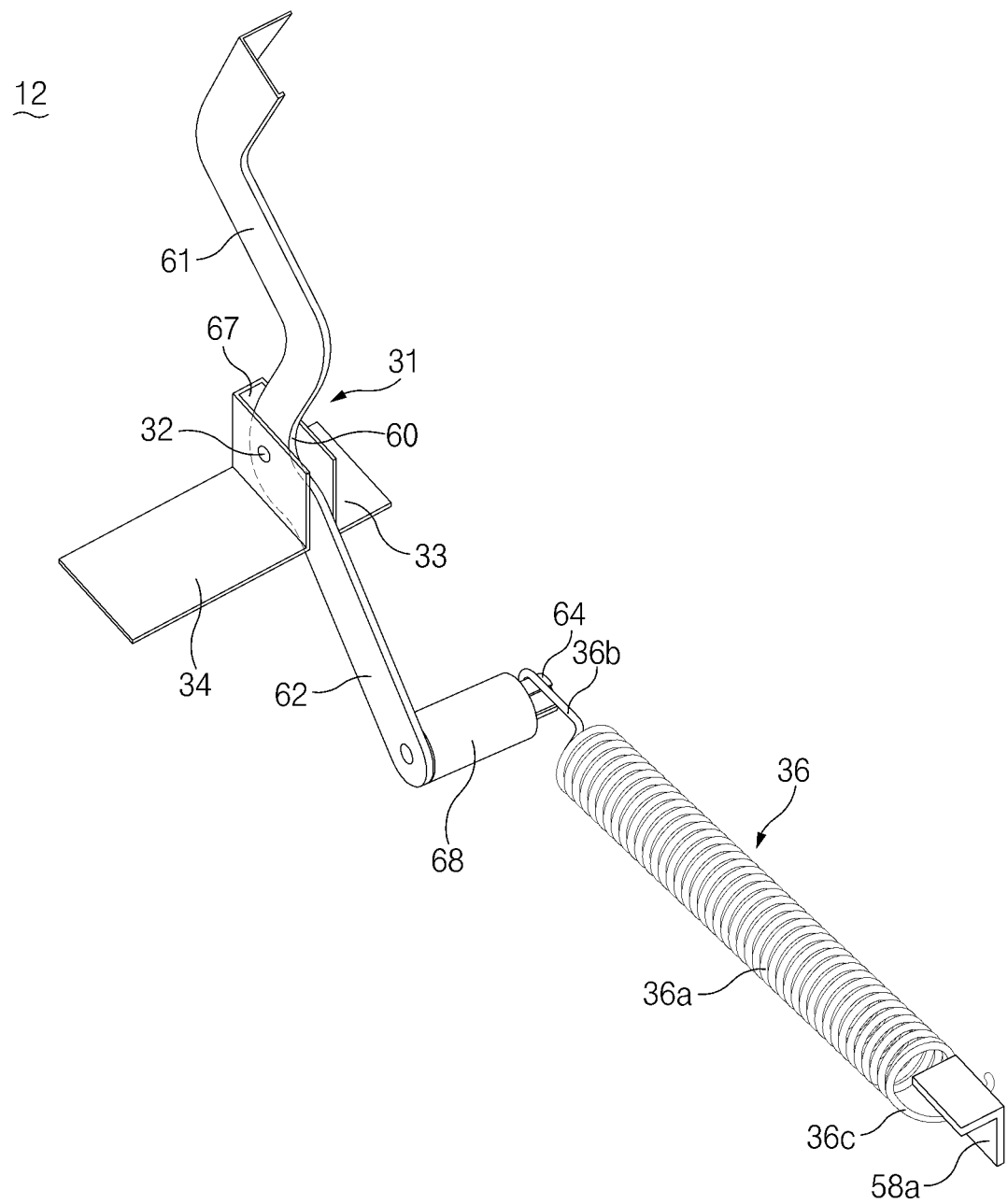
FIG. 18 illustrates a second hinge assembly of a hinge system for a vehicle door according to an exemplary embodiment of the present disclosure.

Referring to FIG. 18, the slave hinge assembly 12 may include a hinge arm 31, a hinge shaft 32, two hinge brackets 33 and 34, and an extension spring 36. The two hinge brackets 33 and 34 may be fixed to the longitudinal member 56 of the vehicle body frame structure 50 using fasteners, welding, and/or the like, and the hinge arm 31 may be rotatably connected to the two hinge brackets 33 and 34 through the hinge shaft 32. The hinge arm 31 may include a base 60 rotatably connected to the hinge brackets 33 and 34 through the hinge shaft 32, a first extension 61 extending from the base 60 toward the vehicle door 5, and a second extension 62 extending from the base 60 toward the vehicle body frame structure 50. The extension spring 36 may include a coil 36a, a first hook 36b provided on one end of the coil 36a, and a second hook 36c provided on the other end of the coil 36a.

Referring to FIG. 18, the slave hinge assembly 12 may further include a connection portion 67 connecting the two hinge brackets 33 and 34, and a mounting projection 68 provided on an end portion of the second extension 62 of the hinge arm 31. The two hinge brackets 33 and 34 may be integrally connected to each other through the connection portion 67, and an engaging member 64 may be fixed to the mounting projection 68 through a fastener. The first hook 36b of the extension spring 36 may engage with the engaging member 64, and the second hook 36c of the extension spring 36 may engage with a fixing lug 58a. Referring to FIG. 12, the fixing lug 58a may be fixed to a transverse member 57a of the vehicle body frame structure 50, and the extension spring 36 of the slave hinge assembly 12 may be connected between the hinge arm 31 and the transverse member 57a of the transverse frame 52.

Considering that the slave hinge assembly 12 does not have a hinge actuator, as the hinge arm 21 of the master hinge assembly 11 is rotated by the hinge actuator 25 and the vehicle door 5 swings accordingly, the hinge arm 31 of the slave hinge assembly 12 may rotate together with the vehicle door 5 and the master hinge assembly 11 in the same direction.

As set forth above, according to exemplary embodiments of the present disclosure, as the hinge arm, the hinge actuator, and the like are located outside the vehicle compartment, the loss of space in the vehicle compartment may be minimized. As the radius of rotation of the hinge arm is relatively reduced, the size, shape, or the like of the hinge arm may be varied, and thus the degrees of freedom in design of the hinge arm may be improved.

In addition, as the hinge actuator is fixed to the vehicle body frame structure and/or the hinge bracket, and the hinge actuator rotates the hinge arm, the operating space of the hinge arm, the operating space of the extension spring, and the volume and mounting space of the actuator may be significantly reduced. Accordingly, the hinge arm, the actuator, and the hinge bracket may be compactly designed outside the vehicle compartment.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A hinge system for a door of a vehicle, the hinge system comprising:
    a wall structure defining a vehicle compartment;
    a vehicle door enclosing the vehicle compartment;
    a vehicle body frame structure configured to surround a periphery of the wall structure, wherein the vehicle body frame structure includes a transverse frame and a longitudinal member surrounding the wall structure;
    a hinge arm mounted between the vehicle door and the vehicle body frame structure;
    a hinge shaft configured to provide an axis of rotation of the hinge arm, and located outside the wall structure; and
    a hinge bracket mounted on the longitudinal member, wherein:
        the transverse frame has a transverse member extending along a width direction of the vehicle,
        the longitudinal member extends along a longitudinal direction of the vehicle, and
        the hinge arm is rotatably connected to the hinge bracket through the hinge shaft.

2. The hinge system according to claim 1, wherein the hinge arm is located outside the wall structure.

3. The hinge system according to claim 1, further comprising an extension spring connected between the hinge arm and the vehicle body frame structure,
    wherein the extension spring is located outside the wall structure.

4. The hinge system according to claim 3,
    the extension spring includes a first hook connected to the hinge arm, and a second hook connected to the transverse member.

5. The hinge system according to claim 1, further comprising a hinge actuator configured to drive the hinge arm,
    wherein the hinge actuator is located outside the wall structure.

6. The hinge system according to claim 5, wherein
    the hinge actuator is mounted on the longitudinal member.

7. The hinge system according to claim 6, wherein the hinge actuator and the hinge bracket are located adjacent to an intersection point between the transverse frame and the longitudinal member.

8. The hinge system according to claim 7, wherein the hinge actuator is fixed to the hinge bracket.

9. The hinge system according to claim 6, wherein the hinge arm includes:
    a base rotatably connected to the hinge bracket through the hinge shaft;
    a first extension extending from the base toward the vehicle door; and
    a second extension extending from the base toward the vehicle body frame structure.

10. The hinge system according to claim 9, wherein the first extension is connected to the vehicle door, and
    the second extension is connected to the vehicle body frame structure through an extension spring.

11. The hinge system according to claim 10, wherein the first extension has a recessed portion adjacent to a top end of an exterior skin of the vehicle, and
    the recessed portion is recessed toward an interior of the vehicle.

12. The hinge system according to claim 11, wherein the first extension includes:
    a proximal straight section extending straightly from a first end portion of the base;
    a proximal curved section curved at a predetermined radius from the proximal straight section;
    a middle straight section extending straightly from the proximal curved section;
    a distal curved section curved at a predetermined radius from the middle straight section; and
    a distal straight section extending straightly from the distal curved section, and
    the recessed portion is defined by the proximal straight section, the proximal curved section, and the middle straight section.

13. The hinge system according to claim 12, wherein, an end portion of the second extension of the hinge arm is closer to the exterior skin than the hinge shaft when the vehicle door is in a fully closed position, and
    the extension spring is connected to the end portion of the second extension.

14. The hinge system according to claim 9, wherein the hinge actuator includes a rotatable output shaft, and an output link extending from the output shaft along the first extension of the hinge arm, and the output link includes a first end portion fixed to the output shaft, and a second end portion fixed to the first extension of the hinge arm.

15. A hinge system for a door of a vehicle, the hinge system comprising:

a hinge arm configured to be mounted between a vehicle door enclosing a vehicle compartment and a vehicle body frame structure surrounding a wall structure that defines the vehicle compartment, wherein the vehicle body frame structure includes a transverse frame and a longitudinal member surrounding the wall structure; and a hinge shaft configured to provide an axis of rotation of the hinge arm, and configured to be located outside the wall structure;

a hinge actuator configured to drive the hinge arm, wherein the hinge actuator is configured to be located outside the wall structure, and configured to be mounted on the longitudinal member of the vehicle body frame structure; and a hinge bracket configured to be mounted on longitudinal member, wherein the hinge arm is rotatably connected to the hinge bracket through the hinge shaft, wherein the transverse frame has a transverse member extending along a width direction of the vehicle, and the longitudinal member extends along a longitudinal direction of the vehicle.

16. The hinge system according to claim 15, wherein the hinge arm includes:

a base rotatably connected to the hinge bracket through the hinge shaft;

a first extension configured to extend from the base toward the vehicle door; and a second extension configured to extend from the base toward the vehicle body frame structure.

17. A method, comprising:

mounting a hinge arm between a vehicle door enclosing a vehicle compartment and a vehicle body frame structure surrounding a periphery of a wall structure that defines the vehicle compartment;

providing a hinge shaft configured to provide an axis of rotation of the hinge arm, wherein the hinge shaft is located outside the wall structure; and providing a hinge bracket mounted on a longitudinal member, wherein:

the vehicle body frame structure includes a transverse frame and the longitudinal member surrounding the wall structure, the transverse frame has a transverse member extending along a width direction of the vehicle, the longitudinal member extends along a longitudinal direction of the vehicle, and the hinge arm is rotatably connected to the hinge bracket through the hinge shaft.

18. The method of claim 17, wherein the hinge arm is mounted outside the wall structure.

19. The method of claim 17, further comprising providing an extension spring connected between the hinge arm and the vehicle body frame structure, wherein the extension spring is located outside the wall structure.

20. The method of claim 17, further comprising providing a hinge actuator configured to drive the hinge arm, wherein the hinge actuator is located outside the wall structure.

* * * * *